United States Patent
Tentrup et al.

(10) Patent No.: US 7,779,544 B2
(45) Date of Patent: Aug. 24, 2010

(54) METHOD AND DEVICE FOR ADJUSTING THE STEERING WHEEL OF A MOTOR VEHICLE

(75) Inventors: Thomas Tentrup, Merzig-Mechern (DE); Andre Deutsch, Herbitzheim (FR); Christoph Meyers, Losheim am See (DE)

(73) Assignee: Dürr Assembly Products GmbH, Püttlingen (DE)

( * ) Notice: Subject to any disclaimer, the term of this patent is extended or adjusted under 35 U.S.C. 154(b) by 0 days.

(21) Appl. No.: 12/308,838

(22) PCT Filed: Jun. 25, 2007

(86) PCT No.: PCT/DE2007/001113

§ 371 (c)(1),
(2), (4) Date: Dec. 26, 2008

(87) PCT Pub. No.: WO2008/000229

PCT Pub. Date: Jan. 3, 2008

(65) Prior Publication Data

US 2009/0288305 A1    Nov. 26, 2009

(30) Foreign Application Priority Data

Jun. 28, 2006  (DE) .................. 10 2006 030 066
Jul. 6, 2006   (DE) .................. 10 2006 031 601

(51) Int. Cl.
*G01B 5/255* (2006.01)

(52) U.S. Cl. ............... 33/203.12; 33/203.15; 33/203.18

(58) Field of Classification Search .............. 33/203.12, 33/203.13, 203.14, 203.21
See application file for complete search history.

(56) References Cited

U.S. PATENT DOCUMENTS

| 4,498,243 A | * | 2/1985 | Kashiwagi ............... 33/203.12 |
| 4,893,413 A | * | 1/1990 | Merrill et al. ............ 33/203.12 |
| 4,961,340 A |   | 10/1990 | Schrammen |
| 5,105,546 A | * | 4/1992 | Weise et al. .............. 33/203.12 |

(Continued)

FOREIGN PATENT DOCUMENTS

DE    78 27 646    4/1981

(Continued)

*Primary Examiner*—Yaritza Guadalupe-McCall
(74) *Attorney, Agent, or Firm*—Collard & Roe, P.C.

(57) ABSTRACT

The invention relates to a method and a device for adjusting the steering wheel of a motor vehicle. The aim of the invention is to enable an automatic adjustment of the steering wheel in the steering clearance center by 'stabilizing' or carrying out a steering hysteresis measurement, and the subsequent adjustment of the steering wheel, in a simple, rapid and cost-effective manner. To this end, the invention relates to a method for adjusting the steering wheel of a motor vehicle in the steering wheel clearance center, the method being characterized by the following steps: the floating plates of the vehicle geometry test bed, on which the front wheels of the motor vehicle are arranged, are rotated when the wheels are stopped in order to cause the rotation of steering wheel; the steering wheel angle is determined according to the triggered steering wheel movement; and the steering wheel clearance center is adjusted. The invention shows that reproducible rotations of the steering wheel can be triggered by the floating plates of the vehicle geometry test bed, enabling an automatic adjustment of the steering wheel in the steering wheel clearance center to be carried out rapidly and easily.

11 Claims, 6 Drawing Sheets

U.S. PATENT DOCUMENTS

| | | | |
|---|---|---|---|
| 5,267,380 A * | 12/1993 | Ronge et al. | 33/203.12 |
| 5,532,816 A * | 7/1996 | Spann et al. | 33/203.19 |
| 5,890,298 A * | 4/1999 | Panter | 33/203.12 |
| 6,473,978 B1 * | 11/2002 | Maas | 33/203.13 |
| 6,532,673 B2 | 3/2003 | Jahn et al. | |
| 6,735,878 B2 * | 5/2004 | Lie | 33/203.12 |
| 6,766,229 B2 | 7/2004 | Dry et al. | |
| 2005/0126020 A1 * | 6/2005 | Gerdes et al. | 33/203.12 |

FOREIGN PATENT DOCUMENTS

| | | |
|---|---|---|
| DE | 100 16 366 | 10/2001 |
| DE | 10 2005 042 446 | 11/2006 |
| EP | 0 329 059 | 8/1989 |
| EP | 1 186 857 | 3/2002 |
| FR | 2 263 500 | 10/1975 |
| WO | WO 00/60308 | 10/2000 |

* cited by examiner

METHOD AND DEVICE FOR ADJUSTING THE STEERING WHEEL OF A MOTOR VEHICLE

CROSS REFERENCE TO RELATED APPLICATIONS

This application is the National Stage of PCT/DE2007/001113 filed on Jun. 25, 2007, which claims priority under 35 U.S.C. §119 of German Application No. 10 2006 030 066.1 filed on Jun. 28, 2006 and German Application No. 10 2006 031 601.0 filed Jul. 6, 2006. The international application under PCT article 21(2) was not published in English.

The invention relates to a method and a device for adjusting the steering wheel of a motor vehicle.

On standard chassis-geometry test rigs, mechanics can center the steering wheel manually. This is done by what is known as "transient oscillation" (German: Einpendeln) of the steering wheel, i.e. the mechanics perform steering movements which help them to center the steering wheel as exactly as possible. However, since this form of adjustment is subjective and requires the mechanic to have a certain amount of experience, production-line settings tend to vary. Measurement of the steering hysteresis, too, and subsequent adjustment of the steering wheel to the center of hysteresis, has hitherto been performed—at best manually and with the associated problems—by a mechanic.

It is also state of the art to perform the above-mentioned adjustments by means of robots that grip the steering wheel through the open vehicle window/windscreen. However, this procedure requires a lot of space and is extremely costly.

The object of the invention is thus to permit automatic centering of the steering wheel by means of "transient oscillation", or measuring the steering hysteresis and subsequently centering the steering wheel, in a simple, fast and cost-effective manner.

This object is established according to the invention by a method of centering the steering wheel of motor vehicles which is characterized by the following steps:

Rotation of at least one of the vehicle-geometry test rig's two floating plates, on which the front wheels of the motor vehicle are disposed, while the wheels are stationary so as to induce rotation of the steering wheel, Determination of the steering-wheel angle as a function of the induced steering-wheel movement, and Centering of the steering wheel.

The invention surprisingly showed that it is possible not only to induce rotation of the wheels on the test rig's floating plates by rotating the steering wheel, but also, vice versa, to induce reproducible steering-wheel rotation via at least one of the two floating plates of the vehicle-geometry test rig. This makes it possible to center the steering wheel automatically without a lot of additional equipment (such as the robots described above). In so far as it is additionally possible to log the position of each wheel in space, the caster inclination and the king pin inclination can also be determined while these measurements are being performed.

One embodiment of the invention consists in that the steering wheel is centered by way of automated transient oscillation of the steering wheel.

It transpired that it is possible to effect transient oscillation of the steering wheel via the floating plates.

Another embodiment of the invention consists in that the steering wheel is centered by determining the steering-wheel hysteresis and subsequently adjusting the steering wheel to the center of hysteresis.

Likewise within the scope of the invention it was established that in this way, the steering-wheel hysteresis can be determined and the steering wheel adjusted to the center of hysteresis.

According to the invention, the steering-wheel angle is determined via a steering-wheel balance or the vehicle's steering-angle sensor.

A steering-wheel balance suitable for this purpose is known from the post-published German patent application with the file number DE 10 2005 042 446.5-21. However, it is also possible to determine the steering-wheel angle via the vehicle's steering-angle sensor.

A development of the invention consists in the following steps:

Rotation of at least one of the vehicle-geometry test rig's two floating plates, on which the front wheels of the motor vehicle are disposed, while the wheels are stationary so as to induce at least three different steering-wheel positions and performance of a measurement over one wheel revolution (German: Umschlagmessung) at each of the steering-wheel positions while the wheels are turning.

Determination of the vehicle's caster inclination by means of a suitable mathematical process.

Using the method of the invention together with adapter plates that represent the position of the wheel in space and form a planar measuring surface corresponding to this position in space, it is namely possible to determine the vehicle's caster inclination, for example with laser triangulation sensors. The caster inclination $\phi$ is the angle formed by the projection of the wheel's steering axis in the vehicle's longitudinal plane (x, z plane) and the perpendicular (z axis) (see FIG. 1). The caster inclination is positive if the steering axis is inclined at the top away from the direction of travel (x direction).

The method can also be developed by the following additional steps:

Attachment of adapter plates to the vehicle wheels, the adapter plates creating a planar measuring surface on the vertical exterior of the wheels, Rotation of at least one of the vehicle-geometry test rig's two floating plates, on which the front wheels of the motor vehicle are disposed, while the wheels are stationary so as to induce rotation of the steering wheel, Determination of the vehicle's caster inclination and king pin inclination by means of a suitable mathematical process.

The king pin inclination $\theta$ is the angle formed by the projection of the wheel's steering axis in the vehicle's transverse plane (y, z plane) and the perpendicular (z axis) (see FIG. 1). The king pin inclination is positive if the steering axis is inclined at the top toward the center of the vehicle.

The scope of the invention also includes a device for carrying out the method of the invention, said device being characterized in that a rig for testing the vehicle's geometry is provided which has, in the area of the motor vehicle's front axle, two floating plates, i.e. one to accommodate each wheel; both floating plates can be "guided" into the functional state while only one of the two floating plates can be "steered" into the functional state in order to rotate the wheel standing thereon in a defined manner. Thus, a rig for testing the geometry of a vehicle is provided which has floating plates to accommodate the wheels, with means being provided for the defined rotation of at least one of the two floating plates, preferably by an angle of 10-45°.

Increasing the rotatability of the floating plates, which can be done at relatively low cost, makes it possible to center the steering wheel.

According to the invention, means for measuring the rotation of the steered and guided floating plate are provided.

It is also expedient that means are provided for carrying out an oscillating movement of the steered and guided floating plate.

These means can, for example, be in the form of a control program for the rotary movement of the steered and guided floating plate.

Additionally, it is expedient that an evaluating unit for centering the steering wheel and/or adjusting the caster is provided.

This evaluating unit permits automatic centering of the steering wheel.

The scope of the invention also includes a device according to the invention, adapter plates being provided on the vertical exterior of the motor vehicle's wheels to create a planar measuring surface . . . .

These adapter plates can be attached to and removed again from the wheel very quickly. They serve to form a planar measuring surface that represents the position of the wheel at any one time. This particular wheel position can be determined quickly and accurately via a multi-point measurement on the measuring surface of the adapter plate.

The invention is explained in detail below by reference to drawings.

FIG. 1 shows the caster inclination $\phi$ in the coordinate system of the vehicle, FIG. 2 shows floating-plate induced oscillation with decreasing amplitude, FIG. 3 shows the adapter plates, FIG. 4 shows the determination of caster and king pin inclination, FIG. 5 shows a device according to the invention for positioning the wheels of a motor vehicle, FIG. 6 is a schematic representation of a motor vehicle on a chassis-geometry test rig according to the invention.

Figure 1:
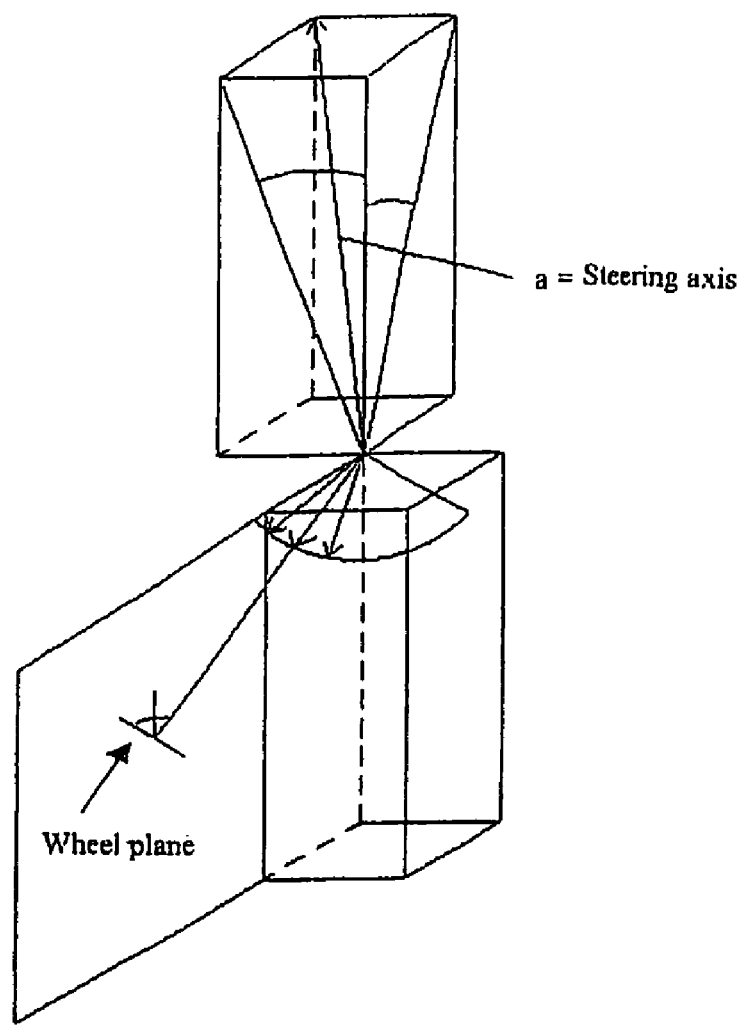
Figure 1:
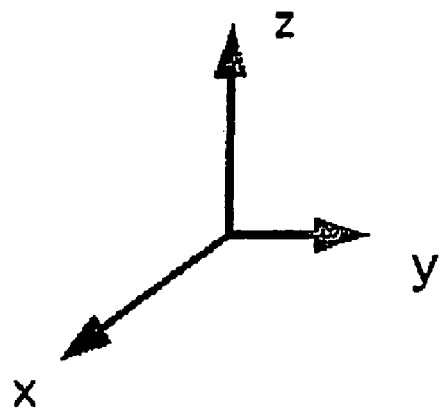
Figure 2:
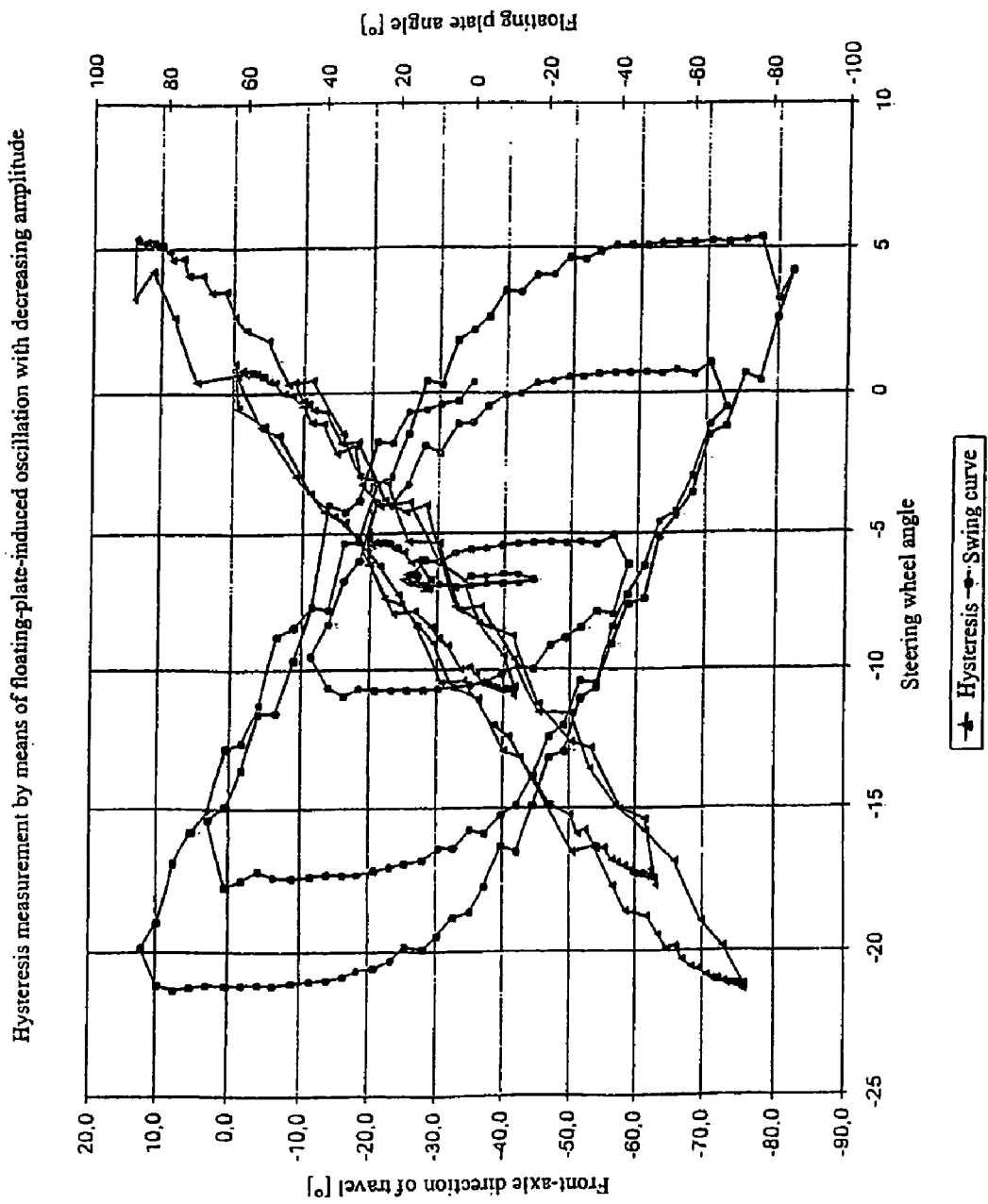
FIG. 2 shows a plot, firstly, of floating-plate rotation (right-hand ordinate) against steering-wheel angle and, secondly, of front-axle direction of travel (left ordinate) against steering-wheel angle. It is easy to see that at the end of the transient oscillation, the steering wheel is centered.
Figure 3:
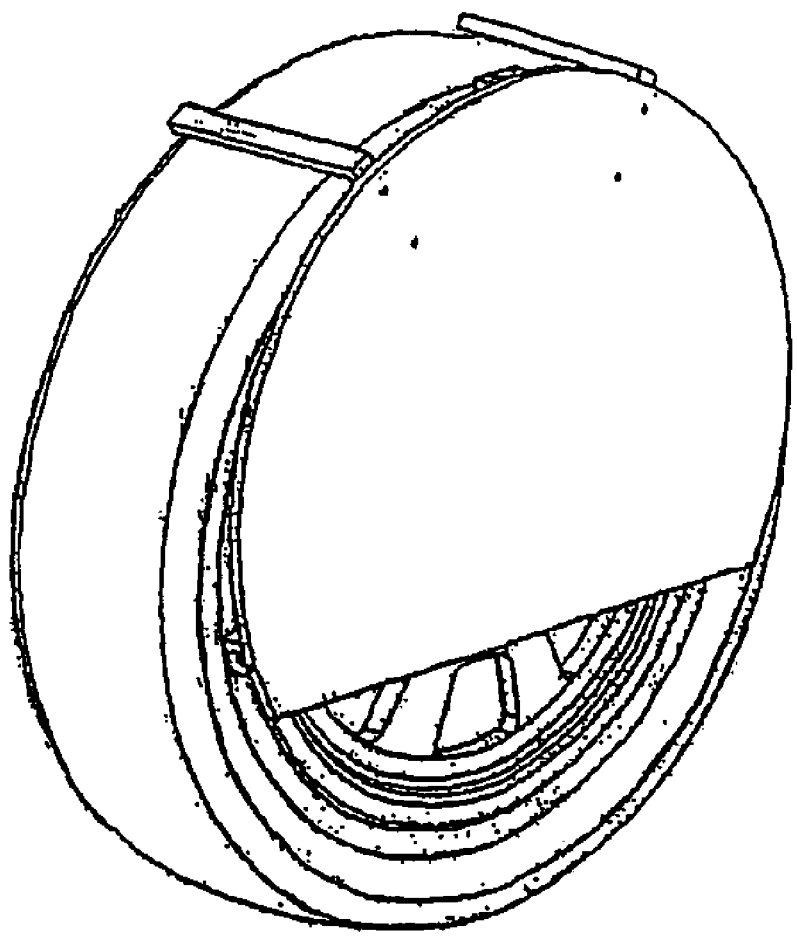
FIG. 3 shows the adapter plates, which can be mounted quickly and easily on the wheels in order to determine the caster inclination (here: within a range of approx. +/−20°.
Figure 4:
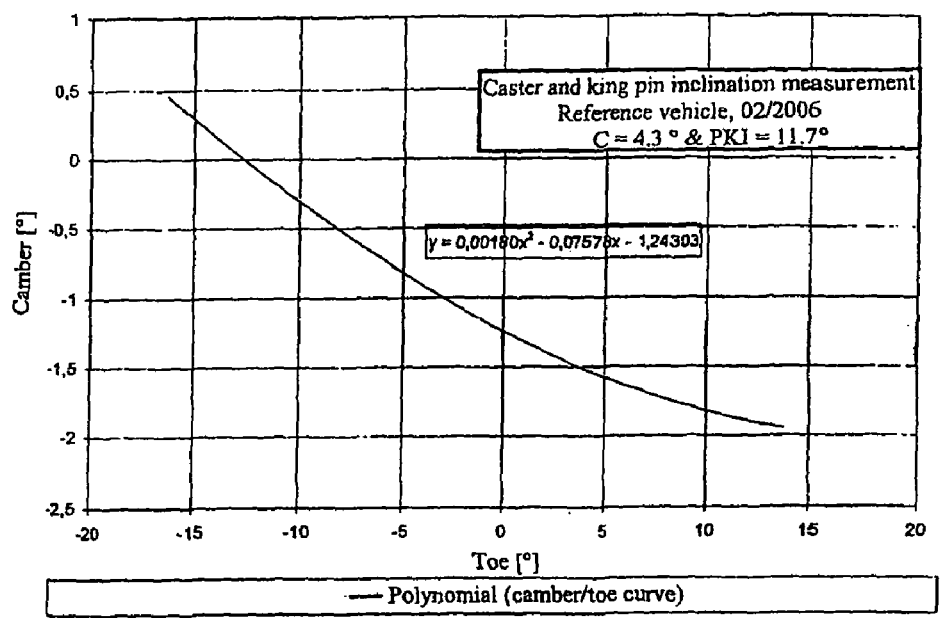

FIG. 4, last of all, shows the determination of caster inclination and king pin inclination as a function of toe and camber, which can be determined by way of laser measurements on the adapter plate.

Figure 5:
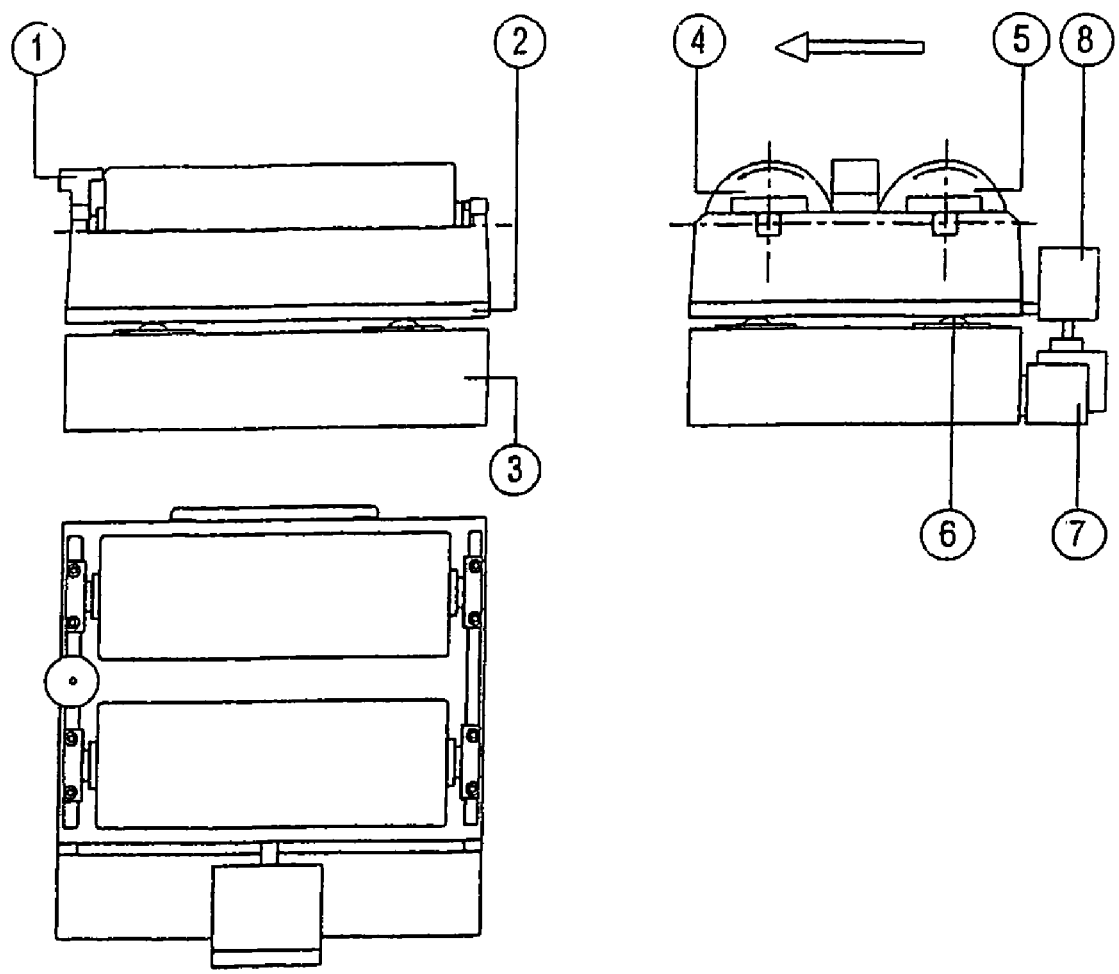
Figure 6:
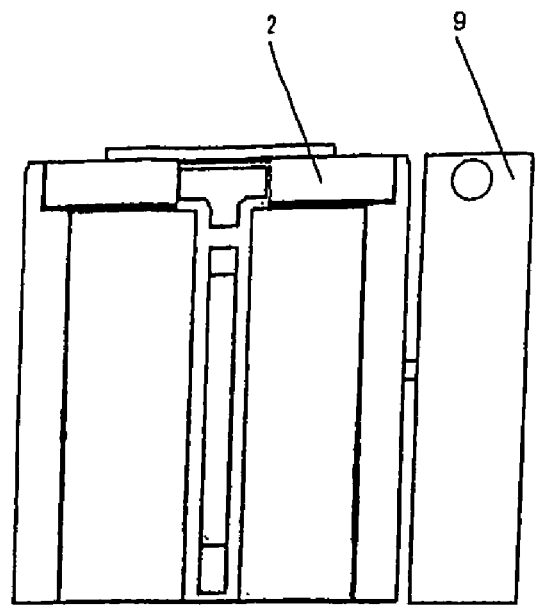
Figure 6:
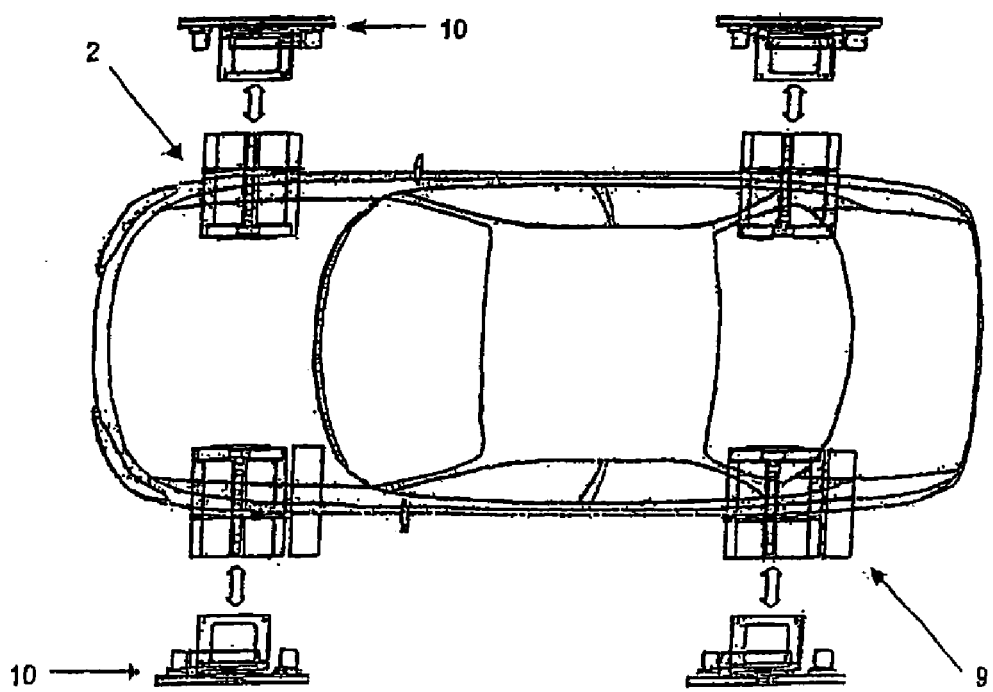

A method of positioning a vehicle on a chassis test rig in order to measure or to measure and adjust the geometry of the wheel axles of a vehicle's wheels and also a device for carrying out the method are known from DE 100 16 366 C2 and are used for positioning the vehicle on the chassis test rig. The means described there for accommodating the wheels consist of floating plates and rollers that rotate the wheel about its axle. In this invention, only the floating plates are of interest, because the floating plate is only rotated when the wheel is stationary. The floating plates have three degrees of freedom: Two translatory x, y in the horizontal plane and one rotatory about the vertical. All the degrees of freedom are limited to suit the measuring task (e.g. 10° or 45° floating plate). As shown in FIG. 5, (arrow points in direction of travel), a device for positioning a motor-vehicle wheel has a floating plate 2 which is arranged by means of a bearing 6 on a base 3, a free roller 4 and a driven roller 5. In addition, an electric servomotor 7 and an anchoring means 8 are provided. All four floating plates 2 of a chassis-geometry test rig (FIG. 6) have at least the following function modes: 1. blocked, i.e. the floating plate is fixed and aligned in the x direction, 2. guided, i.e. the floating plate can rotate about a variable center of rotation (e.g. slot) at the front, 3. free, i.e. the floating plate can move freely, without a center of rotation, in the three degrees of freedom and 4. arrested, i.e. the floating plate is fixed in the current position.

On one side (left or right) the floating plates have, at the front and the rear, an additional, $5^{th}$ function mode: 5. steered, i.e. by means of an additional linear actuator 9 (e.g. linear guideway with servomotor) attached to the rear of the floating plate and including a measuring system 10 for measuring the distance of travel, the floating plate 2 can be rotated in a defined manner.

To rotate the front wheels about the vertical, the following function modes are set for the floating plates:

rear left-hand and right-hand floating plates: blocked or arrested front right-hand floating plate: guided and steered front left-hand floating plate: guided The front wheels can now be rotated about the vertical via the actuator at the front right.

The invention claimed is:

1. Method of centering the steering wheel of motor vehicles, comprising the following steps:
    rotation of at least one of the vehicle-geometry test rig's two floating plates, on which the front wheels of the motor vehicle are disposed, while the wheels are stationary so as to induce rotation of the steering wheel,
    determination of the steering-wheel angle as a function of the induced steering-wheel movement, and
    centering of the steering wheel.

2. Method according to claim 1, wherein the steering wheel is centered by way of automated transient oscillation of the steering wheel.

3. Method according to claim 1, wherein the steering wheel is centered by determining the steering-wheel hysteresis and subsequently adjusting the steering wheel to the center of hysteresis.

4. Method according to claim 1, wherein the steering-wheel angle is determined via a steering-wheel balance or the vehicle's steering-angle sensor.

5. Method according to claim 1, comprising the following additional steps:
    rotation of the vehicle-geometry test rig's floating plates, on which the front wheels of the motor vehicle are disposed, while the wheels are stationary so as to induce at least three different steering-wheel positions and performance of a measurement over one wheel revolution at each of the steering-wheel positions while the wheels are turning, and
    determination of the vehicle's caster inclination by means of a suitable mathematical process.

6. Method according to claim 1, comprising the following additional steps:
    attachment of adapter plates to the motor vehicle's wheels, the adapter plates creating a planar measuring surface on the vertical exterior of the wheels,
    rotation of the vehicle-geometry test rig's floating plates, on which the front wheels of the motor vehicle are disposed, while the wheels are stationary so as to induce rotation of the steering wheel,
    determination of the vehicle's caster inclination and king pin inclination by way of parabolic regression.

7. Device for carrying out the method according to claim 1, wherein a rig for testing the vehicle's geometry is provided, which has, in the area of the motor vehicle's front axle, two floating plates, i.e. one to accommodate each wheel; both floating plates can be "guided" into the functional state while only one of the two floating plates can be "steered" into the functional state in order to rotate the wheel standing thereon in a defined manner.

8. Device according to claim 7, wherein means for measuring the rotation of the steered and guided floating plate are provided.

9. Device according to claim 7, wherein means for performing an oscillatory movement of the steered and guided floating plate are provided.

10. Device according to claim 7, wherein an evaluating unit for centering the steering wheel and/or adjusting the caster inclination is provided.

11. Device according to claim 7, wherein adapter plates are provided on the vertical exterior of the motor-vehicle's wheels to create a planar measuring surface.

* * * * *